United States Patent
Adriazola

(10) Patent No.: US 9,386,075 B2
(45) Date of Patent: Jul. 5, 2016

(54) FLEXIBLE DOWNLOAD DESTINATION

(75) Inventor: Aldo Adriazola, Bridgewater, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1122 days.

(21) Appl. No.: 12/633,383

(22) Filed: Dec. 8, 2009

(65) Prior Publication Data

US 2011/0138015 A1  Jun. 9, 2011

(51) Int. Cl.
| | | |
|---|---|---|
| G06F 15/16 | (2006.01) | |
| H04L 29/08 | (2006.01) | |
| G06F 9/445 | (2006.01) | |
| G06F 17/30 | (2006.01) | |

(52) U.S. Cl.
CPC ...... *H04L 67/06* (2013.01); *G06F 8/61* (2013.01); *G06F 17/3089* (2013.01); *H04L 67/2814* (2013.01)

(58) Field of Classification Search
USPC ............. 709/219, 224, 203, 204; 715/132
See application file for complete search history.

(56) References Cited

U.S. PATENT DOCUMENTS

| | | | | |
|---|---|---|---|---|
| 6,831,915 B1* | 12/2004 | Beyschlag et al. | ............ | 370/352 |
| 7,277,938 B2* | 10/2007 | Duimovich et al. | .......... | 709/224 |
| 7,970,863 B1* | 6/2011 | Fontaine | ........................ | 709/218 |
| 8,433,819 B2* | 4/2013 | Twitchell, Jr. | ........ | H04L 45/586 709/203 |
| 2002/0052947 A1* | 5/2002 | Duimovich et al. | .......... | 709/224 |
| 2002/0083133 A1* | 6/2002 | Feigenbaum | ........... | H04L 29/06 709/203 |
| 2003/0061282 A1* | 3/2003 | Ebata | ...................... | H04L 29/06 709/203 |
| 2004/0054723 A1* | 3/2004 | Dayal | ................... | H04L 67/104 709/204 |
| 2004/0073707 A1* | 4/2004 | Dillon | ........................... | 709/245 |
| 2005/0071418 A1* | 3/2005 | Kjellberg et al. | ............. | 709/200 |
| 2006/0098644 A1* | 5/2006 | Pullela et al. | .................. | 370/389 |
| 2007/0029983 A1* | 2/2007 | Jiang et al. | ..................... | 323/274 |
| 2007/0288986 A1* | 12/2007 | Candelore | ............ | H04N 7/1675 725/132 |
| 2008/0301231 A1* | 12/2008 | Mehta et al. | ................... | 709/204 |
| 2011/0138015 A1* | 6/2011 | Adriazola | ..................... | 709/219 |
| 2014/0019604 A1* | 1/2014 | Twitchell, Jr. | ........ | H04L 45/586 709/223 |
| 2014/0165119 A1* | 6/2014 | Liu et al. | ......................... | 725/92 |

* cited by examiner

*Primary Examiner* — Tammy Nguyen

(74) *Attorney, Agent, or Firm* — Hartman & Citrin LLC

(57) ABSTRACT

Methods, systems, and computer-readable media for providing a flexible download destination are provided. A download request for content transmitted from a first device to a content server is detected. In response to detecting the download request, a determination is made as to whether a user of the first device has subscribed to a flexible download destination service. Upon determining that the user of the first device has subscribed to the flexible download destination service, an interface for selecting alternate download destinations is provided. A selection of a second device is received through the interface. A transfer of the content to the second device is coordinated.

19 Claims, 3 Drawing Sheets

FLEXIBLE DOWNLOAD DESTINATION

BACKGROUND

This application relates generally to the field of computer networks. More specifically, the disclosure provided herein relates to providing a flexible download destination for multimedia content.

Multimedia content stored on storage media is traditionally sold through brick-and-mortar retailers. The development of the Internet has moved the sale of multimedia content from brick-and-mortar retailers to online retailers. In many cases, brick-and-mortar retailers will even have a corresponding online presence. Instead of selling physical products containing the multimedia content, online retailers may sell an authorization to download the multimedia content from an online media store. Upon purchasing the authorization, the customer may then download the multimedia content directly to a personal computer or other device.

Conventionally, multimedia content is purchased and downloaded through a single device. For example, a customer operating a video game system accesses an online video game store through the video game system. The customer selects a video game from the online video game store and enters payment information to purchase the selected video game. Upon receiving authorization from the online video game store, the customer downloads the game directly onto the video game system. The customer can then play the purchased game on the video game system.

In some instances, a customer may also connect a secondary device to a primary device utilized to purchase and download the multimedia content. The customer may then replicate the purchased multimedia content from the primary device to the secondary device. For example, a customer operating a personal computer accesses an online music store that sells music in a proprietary format controlled by digital rights management. The customer selects a song from the online music store and enters payment information to purchase the selected song. Upon receiving authorization from the online music store, the customer downloads the song to the personal computer. The customer can then connect a portable music player to the personal computer and initiate a synchronization sequence adapted to transfer the purchased song from the personal computer to the portable music player. The customer can then play the purchased song on the portable music player.

When multimedia content is purchased and downloaded through a single device, the customer may need to be present at the device in order to purchase and download the multimedia content. Further, when multimedia content is purchased and downloaded through a primary device and replicated to a secondary device, the customer may need not only to be present at the primary device in order to purchase and download the multimedia content, but also to have possession of the secondary device in order to connect the secondary device to the primary device and to initiate the synchronization sequence. In both cases, the customer may not be able to purchase and/or download multimedia content when one or more of the devices to which the multimedia content is downloaded and/or replicated are unavailable.

SUMMARY

Embodiments of the disclosure presented herein include methods, systems, and computer-readable media for providing a flexible download destination. According to one aspect, a method for providing a flexible download destination is provided. According to the method, a download request for content transmitted from a first device to a content server is detected. In response to detecting the download request, a determination is made as to whether a user of the first device has subscribed to a flexible download destination service. Upon determining that the user of the first device has subscribed to the flexible download destination service, an interface for selecting alternate download destinations is provided. A selection of a second device is received through the interface. A transfer of the content to the second device is coordinated.

According to another aspect, a system for providing a flexible download destination is provided. The system includes a memory and a processor functionally coupled to the memory. The memory stores a program containing code for providing the flexible download destination. The processor is responsive to computer-executable instructions contained in the program and configured to perform the following operations. A determination is made as to whether a user of the first device has subscribed to a flexible download destination service. Upon determining that the user of the first device has subscribed to the flexible download destination service, an interface for selecting alternate download destinations is provided. A selection of the second device is received through the interface. A transfer of the content to the second device is coordinated.

According to yet another aspect, a computer-readable medium having instructions stored thereon for execution by a processor to perform a method for providing a flexible download destination is provided. According to the method, a determination is made as to whether a user of the first device has subscribed to a flexible download destination service. Upon determining that the user of the first device has subscribed to the flexible download destination service, an interface for selecting alternate download destinations is provided. A selection of the second device is received through the interface. A transfer of the content to the second device is coordinated.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for providing a flexible download destination. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
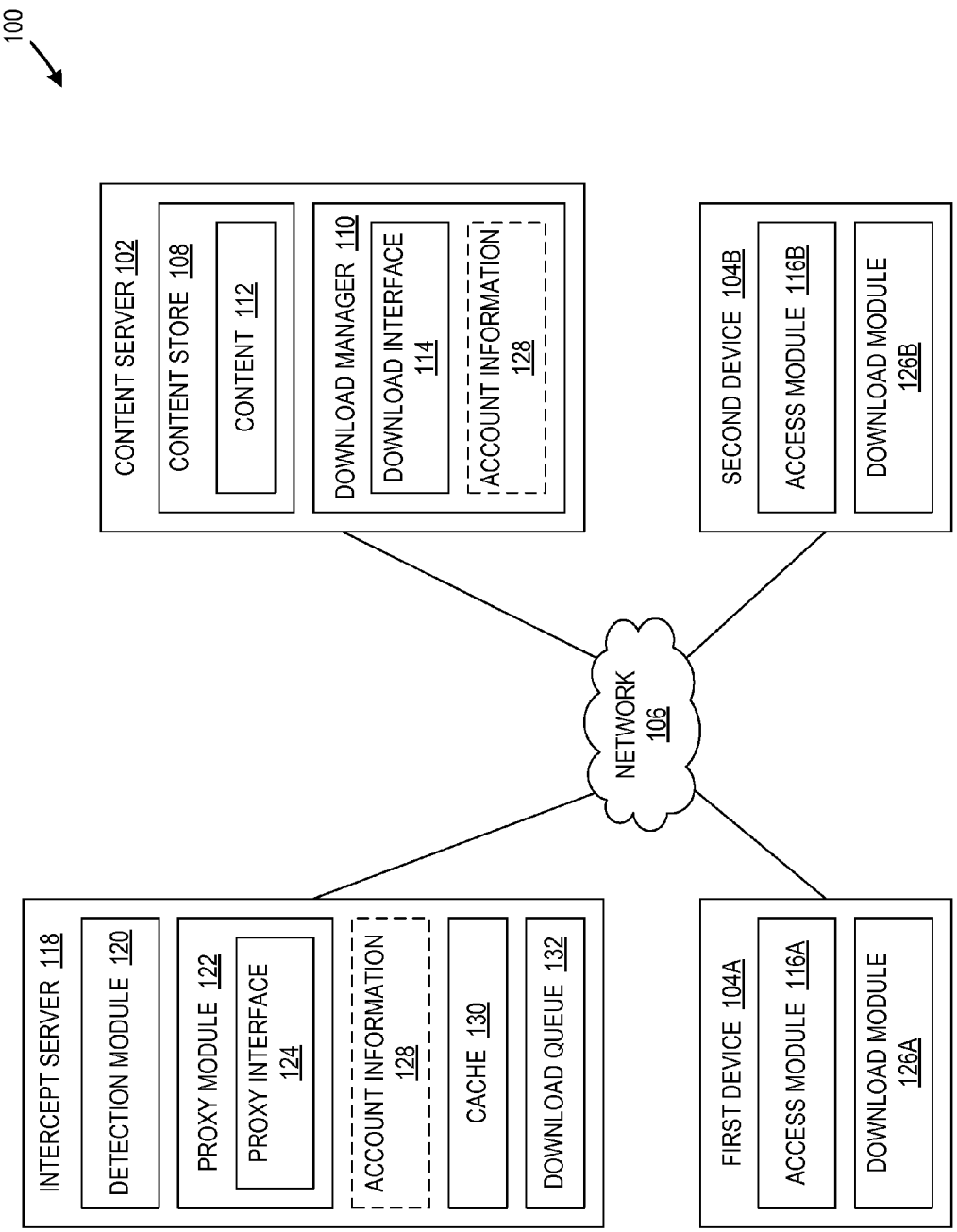
FIG. 1 is a block diagram illustrating an exemplary network environment configured to provide a flexible download destination, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, FIG. 1 is a block diagram illustrating an exemplary network environment 100 configured to provide a flexible download destination ("FDD") for multimedia content, in accordance with some embodiments. The network environment 100 includes a content server 102, a first device 104A, and a second device 104B coupled via a network 106. The network 106 may be a wireline network or a wireless network. The first device 104A and the second device 104B may be collectively referred to as devices 104. Examples of the devices 104 may include personal computers, mobile devices (e.g., mobile phones, portable media players, personal digital assistants ("PDAs"), etc.), video game consoles, network-based storage, and the like.

The content server 102 includes a content store 108 and a download manager 110. The content store 108 may store multimedia content, such as content 112. The multimedia content may include text, images, audio, video, and combinations thereof. The first device 104A may download the content 112 by accessing a download interface 114 through a first access module 116A. Similarly, the second device 104B may also download the content 112 by accessing the download interface 114 through a second access module 116B. The access modules 116A, 116B may be collectively referred to as access modules 116.

In some embodiments, the access modules 116 may be a web browser, and the download interface 114 may be embodied in a web page provided through a web server (not shown). In some other embodiments, the access modules 116 may be any suitable applications adapted to download the content 112 from the content store 108 with or without accessing the download interface 114. In some embodiments, the download interface 114 may provide a virtual storefront that enables customers to browse and purchase the content 112. In this case, the download manager 110 may handle payment processing of the content 112 among other functions. In further embodiments, the download manager 110 may limit access to the download interface 114 by authenticating customer credentials (e.g., a username and password) received from the access modules 116.

In conventional implementations, a user cannot utilize the first device 104A to download the content 112 directly to the second device 104B. If the user wants the content 112 on the second device 104B, the user can independently access the second device 104B and download the content 112 to the second device 104B. Alternatively, the user can access the first device 104A and download the content 112 to the first device 104A. The user can then couple the second device 104B to the first device 104A and initiate a synchronization sequence whereby the content 112 is transferred from the first device 104A to the second device 104B. In some instances, the first device 104A may not even be capable of downloading the content 112. For example, the first device 104A may be a mobile phone with which the user reads an article about a video game for a video game console. A virtual storefront that sells the video game may only allow download requests from the video game console. In this case, if the user reads the article in the office and video game console is at home, the user cannot immediately download the video game because the user cannot access the video game console. Instead, the user can only wait until the user can return home to download the video game.

In order to address the above drawbacks with conventional implementations, an intercept server 118 is provided according to embodiments. The intercept server 118 may include a detection module 120 and a proxy module 122. The detection module 120 may be configured to detect requests from at least the first access module 116A to download the content 112. In one embodiment, the detection module 120 includes one or more network elements within the network 106 adapted to detect download requests, such as a File Transfer Protocol ("FTP") request, between at least the first device 104A and the content server 102. In another embodiment, the detection module 120 may be coupled to the first device 104A and adapted to detect download requests transmitted from the first access module 116A. In yet another embodiment, the detection module 120 may be coupled to the content server 102 and adapted to detect download requests received at the download interface 114.

Upon detecting the download request from the first access module 116A, the detection module 120 may direct the access module 116A to a proxy interface 124. According to some embodiments, the proxy interface 124 may provide a list containing one or more alternate or additional destinations, such as the second device 104B, for the content 112. Through the proxy interface 124, the user can then select at least one of the alternate or additional destinations for the content 112. If the user selects one of the alternate or additional destinations, the proxy module 122 may instruct the download manager 110 to transmit the content 112 to the selected destinations. Alternatively, the proxy module 122 may request the content 112 from the content server 102 and store the content 112 in a cache 130. The proxy module 122 may then transmit the content 112 from the cache 130 to the selected destinations. The proxy interface 124 may also enable to select the original destination of the first device 104A.

According to some embodiments, the proxy module 122 may be programmed to automatically direct the content 112 to the second device 104B. For example, the proxy module 122 may be programmed to direct video games to a video game console. If the content 112 is a video game and the second device 104B is a video game console, then the proxy module 122 may automatically direct the content 112 to the second device 104B without receiving a user request through the proxy interface 124.

According to some embodiments, the devices 104 may further include download modules 126A, 126B (collectively referred to as download modules 126). The download modules 126 may be adapted to receive the content 112 transmitted from the cache 130 or the download manager 110. In some embodiments, the download modules 126 download the content 112 when a user at the devices 104 authorizes the download. In some other embodiments, the download modules 126 download the content 112 in the background without immediate user authorization (e.g., if the user has previously granted permission for all downloads from the content server 102). For example, if the second device 104B is online and has user authorization, the proxy module 122 may instruct the download manager 110 to direct the transmission of the content 112 to the second device 104B. The second download module 126B may then coordinate the transfer of the content 112 to the second device 104B. If the second device 104B is not online or does not have user authorization, the proxy module 122 may store an indication to retry the download in a download queue 132. The proxy module 122 may instruct the download manager 110 to direct the transmission of the content 112 to the second device 104B at a later time, such as when the devices 104 are online. In some embodiments, the user may also delete entries in the download queue 132.

As previously described, the intercept server 118 and the content server 102 are separate servers coupled through the network 106. In further embodiments, at least some of the functionality of the detection module 120 and the proxy module 122 may be implemented in the download manager 110 and the download interface 114. For example, when a user requests the content 112 through the download interface 114, the download interface 114 may display the list of alternate or additional destinations. When the user selects one or more of the alternate or additional destinations, the download manager 110 may direct the transmission of the content 112 to the selected destinations. In this case, the download manager 110 may also utilize the proxy module 122 to determine whether the devices 104 are online.

According to some embodiments, the detection module 120 may detect download requests according to a FDD service offered to users of the devices 104. When a user subscribes to the FDD service, the user may register the devices 104 in order to associate the devices 104 with the user. In particular, the registered devices 104 may be stored in the user's account information 128. If the provider of the content server 102 provides the FDD service, then the account information 128 may be stored on the content server 102. If a third party provider provides the FDD service, then the account information 128 may be stored on the intercept server 118. The account information 128 is illustrated as a dotted line in FIG. 1 to indicate that the account information 128 can be included on the intercept server 118 and/or the content server 102 depending on implementation. According to some embodiments, the user may register the devices 104 by providing a device identifier, such as a media access control ("MAC") address, for each of the devices 104 to the detection module 120. The device identifier may be utilized to identify data packets transmitted by users who subscribe to the FDD service. For example, the detection module 120 may ignore data packets transmitted by users who do not subscribe to the FDD service. The device identifier may also be utilized to identify alternate or additional destinations for downloading the content 112. The user may also register the alternate or additional destinations upon requesting to download the content 112.

The embodiments described herein may decouple the device utilized to browse and purchase content from the device utilized to receive and store the content. For example, although the user may utilize the first device 104A to browse and purchase the content 112, the user may request that the content 112 be directed to the second device 104B. The embodiments described herein may also eliminate or reduce the need for docking and syncing multiple devices in order to share content. The embodiments described herein may even provide automatic redundancy by directing content to multiple destinations.

Two examples will now be described to further illustrate the operation of the intercept server 118, the download manager 110, and the download modules 126. In these examples, the account information 128 is stored in the content server 102. In further embodiments, the account information 128 may be stored in the intercept server 118 as previously described. In a first example, the first device 104A is a mobile device, and the second device 104B is a desktop computer. Further, the download interface 114 provides an online media store. A customer utilizes the first device 104A to access the download interface 114 to purchase the content 112. The account information 128 indicates that the customer has two registered devices: the first device 104A and the second device 104B. The download manager 110 sends a query to the proxy module 122 to determine the status of the devices 104. The proxy module 122 responds to the query with a notification that both of the devices 104 are active on the network 106. The download interface 114 then prompts the customer to select one or more of the devices 104 as destinations for the purchased content 112. In this example, the customer chooses to have the content 112 sent to both of the devices 104. The download manager 110 sends a notification to the proxy module 122 to begin replication of the content 112 to the devices 104 specified by the customer. The proxy module 122 sends notification to the devices 104, through the corresponding download modules 126, to await reception of the content 112. The proxy module 122 may transmit the content 112 from the cache 130 to the download modules 126. Alternatively, the download modules 126 may request the content 112 directly from the download manager 110. Upon completion of the download, the proxy module 122 queries both of the download modules 126 to determine if the content 112 has been received. When both of the download modules 126 reply that the content 112 has been received successfully, the proxy module 122 notifies the download manager 110 that all requested downloads were successful. The download manager 110 then marks the download as complete for both of the devices 104.

In contrast to the first example, in a second example, the first device 104A replies that the transfer was successful, but the second device 104B responds that the content 112 was not received. The proxy module 122 then notifies the download manager 110 that only one of the downloads was successful. For example, the proxy module 122 may send a device identifier and a status (i.e., successful download or unsuccessful download) for each of the devices 104. The proxy module 122 then sets a retry timer to retransfer the content 112 to the second device 104B. The download manager 110 marks the download as complete for the first device 104A but pending for the second device 104B. When the retry timer expires, the proxy module 122 sends a notification to the second device 104B to await reception of a content 112. The content 112 may then be sent to the second device 104B from the cache 130 in the network 106. Alternatively, the download modules 126 may request the content 112 directly from the download manager 110. Upon completion of the download, the proxy module 122 queries the second device 104B to determine if the content 112 has been received. The second device 104B replies that the content 112 has been successfully received. The proxy module 122 then notifies the download manager 110 that the requested downloads were successful. The proxy module 122 changes the status of the download to the second device 104B from pending to complete.

Figure 2:
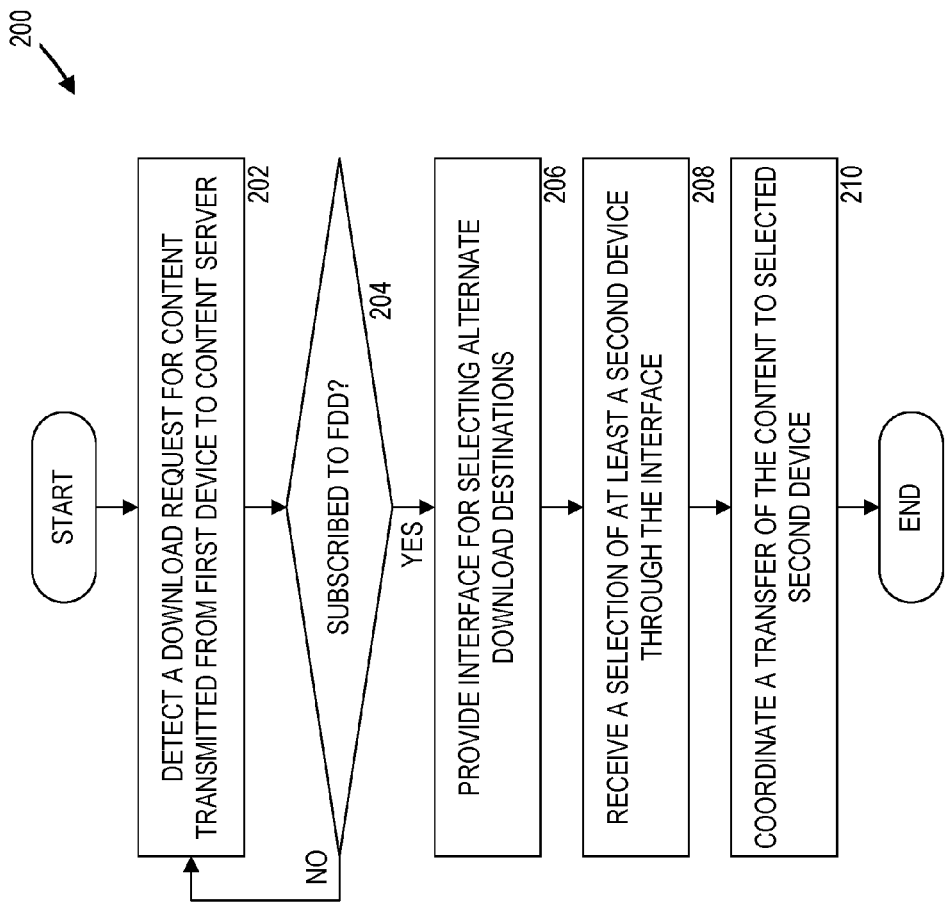
FIG. 2 is a flow diagram illustrating an exemplary method for providing a flexible download destination, in accordance with some embodiments.

Referring to FIG. 2, additional details will be provided regarding the operation of the intercept server 118. In particular, FIG. 2 is a flow diagram illustrating an exemplary method 200 for providing a flexible download destination, in accordance with some embodiments. The method 200 begins at operation 202, where the detection module 120 detects a download request for the content 112 transmitted from the first device 104A to the content server 102. For example, the detection module 120 may include network elements in the network 106. The network elements may be adapted to detect the download request. When the detection module 120 detects the download request, the method 200 proceeds to operation 204.

At operation 204, the detection module 120 determines whether the user of the first device 104A has subscribed to the FDD service. For example, the user's account information 128 may contain the registered MAC address of the devices 104, thereby indicating that the user has subscribed to the FDD service. If the detection module 120 determines that the user has not subscribed to the FDD service, then the method 200 proceeds back to operation 202, where the detection module 120 continues to monitor download requests. If the detection module 120 determines that the user has subscribed to the FDD service, then the method proceeds to operation 206.

At operation 206, the proxy module 122 provides an interface, such as the proxy interface 124, to the user of the first device 104A. The interface may be adapted to enable the user to select one or more alternate download destinations, such as the second device 104B, to receive the content 112. The interface may further enable the user to select the original destination of the first device 104A. The method 200 then proceeds to operation 208, where the proxy module 122 receives a selection of at least the second device 104B through the interface. When the proxy module 122 receives the selection of at least the second device 104B through the interface, the method 200 proceeds to operation 210.

At operation 210, the proxy module 122 coordinates a transfer of the content 112 to the second device 104B. In some embodiments, the proxy module 122 may request the content 112 from the content server 102 and store the content 112 in the cache 130. The proxy module 122 can then transfer the content 112 to the second device 104B. In some other embodiments, the proxy module 122 may instruct the download manager 110 to directly transfer the content 112 to the second device 104B. When the proxy module 122 coordinates the transfer of the content 112 to the second device 104B, the proxy module 122 can mark the download as complete, and the method 200 terminates.

Figure 3:
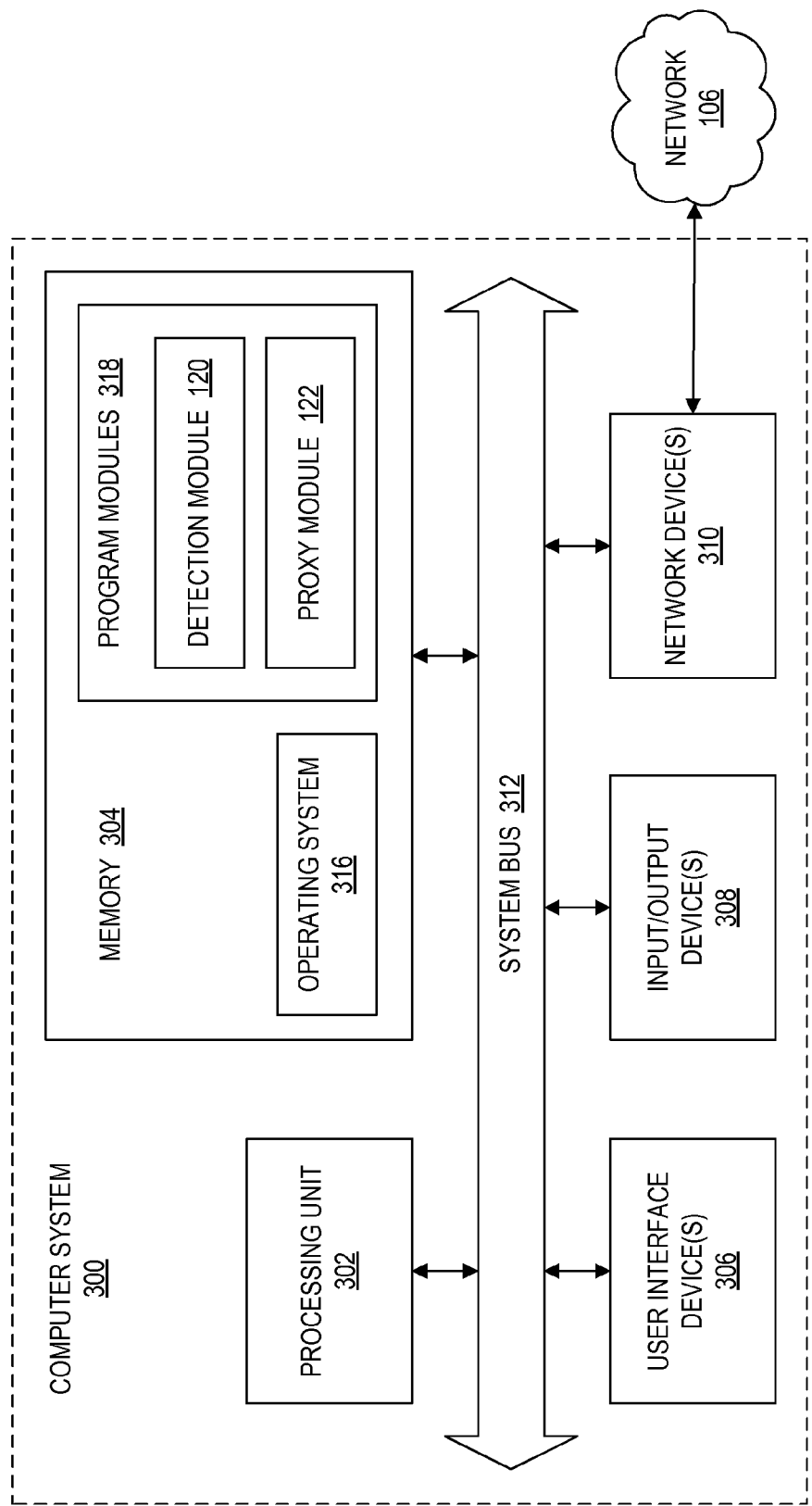
FIG. 3 is a block diagram illustrating an exemplary computer system configured to provide a flexible download destination, in accordance with some embodiments.

FIG. 3 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating a computer system 300 configured to provide network-based audience measurement, in accordance with embodiments. The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 316 and one or more program modules 318, according to exemplary embodiments. Examples of operating systems, such as the operating system 316, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. The program modules 318 may include the detection module 120 and the proxy module 122. In some embodiments, the detection module 120 and the proxy module 122 are embodied in computer-readable media containing instructions that, when executed by the processing unit 302, performs the method 200 for providing a flexible download destination, as described in greater detail above with respect to FIG. 2. According to embodiments, the program modules 318 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 318. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via the network 106. Examples of the network devices 310 may include, but are not limited to, a modem, a radio frequency ("RF") or infrared ("IR") transceiver, a telephonic interface, a bridge, a router, or a network card. The network 106 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 106 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method comprising:
   registering, by a first device comprising a processor that executes a detection module and a proxy module, a second device for a flexible download destination service that allows transfer of content to multiple devices, wherein registering the second device comprises associating the second device with a user associated with the second device and obtaining a media access control address associated with the second device;
   detecting, at the first device, a download request for the content, wherein the download request is transmitted from the second device to a content server that stores the content, and wherein the second device executes an access module;
   in response to detecting the download request, determining, by the first device and based upon the media access control address, whether the user associated with the second device has subscribed to the flexible download destination service;
   upon determining that the user associated with the second device has subscribed to the flexible download destination service by determining that account information associated with the user comprises the media access control address and a device identifier that corresponds to a third device, directing the access module executed by the second device to access and present a proxy interface that is hosted by the first device, wherein the proxy interface includes a list containing alternate download destinations, wherein the list includes the second device and the third device;
   receiving, by the first device and from the second device, a selection of the third device, wherein the selection is made via the proxy interface; and
   instructing, by the first device, the content server to transfer the content to the third device.

2. The method of claim 1, wherein instructing the content server to transfer the content to the third device comprises:
   requesting the content from the content server;
   receiving the content from the content server; and
   transferring the content to the third device.

3. The method of claim 1, wherein instructing the content server to transfer the content to the third device comprises:
   determining if the third device is available to transfer the content;
   if a first determination is made that the third device is available to transfer the content, instructing the content server to transfer the content to the third device; and
   if a second determination is made that the third device is not available to transfer the content, storing an indication to retry a download in a download queue, and instructing the content server to transfer the content to the third device at a later time in accordance with the indication.

4. The method of claim 1, wherein receiving the selection of the third device comprises receiving a selection of the third device and a fourth device, and wherein instructing the content server to transfer the content to the third device comprises instructing the content server to transfer the content to the second device, the third device, and the fourth device.

5. The method of claim 1, further comprising:
   detecting a second download request, the second download request comprising a request to download video game content; and
   instructing the content server to transmit the video game content to a video game console without presenting the proxy interface.

6. The method of claim 1, wherein the device identifier comprises another media access control address.

7. A system comprising:
   a processor; and
   a memory that stores computer-executable instructions that, when executed by the processor, causes the processor to perform operations comprising
      registering a first device for a flexible download destination service that allows transfer of content to multiple devices, wherein registering the first device comprises associating the first device with a user associated with the first device and obtaining a media access control address associated with the first device, and wherein the first device executes an access module,
      detecting a download request for the content, wherein the download request is transmitted from the first device to a content server that stores the content,
      in response to detecting the download request, determining, based upon the media access control address, whether the user associated with the first device has subscribed to the flexible download destination service,
      upon determining that the user associated with the first device has subscribed to the flexible download destination service by determining that account information associated with the user comprises the media access control address and a device identifier that corresponds to a second device, directing the access module executed by the first device to access and present a proxy interface that includes a list containing alternate download destinations, wherein the list includes the first device and the second device, receiving, from the first device, a selection of the second device, wherein the selection is made via the proxy interface, and instructing the content server to transfer the content to the second device.

8. The system of claim 7, wherein instructing the content server to transfer the content to the second device comprises instructing the content server to transmit the content to the first device and the second device.

9. The system of claim 7, wherein instructing the content server to transfer the content to the second device comprises requesting the content from the content server, upon requesting the content from the content server, receiving the content from the content server, and transferring the content to the second device.

10. The system of claim 7, wherein instructing the content server to transfer the content to the second device comprises determining whether the second device is available to transfer the content, in response to determining that the second device is available to transfer the content, instructing the content server to transfer the content to the second device, and in response to determining that the second device is not available to transfer the content, storing an indication to retry a download in a download queue, and instructing the content server to transfer the content to the second device at a later time in accordance with the indication.

11. The system of claim 7, wherein the first device comprises a video game console, and wherein the content comprises video game content.

12. The system of claim 7, wherein the first device comprises a network storage device.

13. The system of claim 7, further comprising a video game console, wherein the content comprises video game content, wherein the content is transferred to the video game console without receiving a request through the proxy interface, and wherein the content is also transferred to the second device based on the selection made via the proxy interface.

14. A non-transitory computer storage medium having instructions stored thereon that, when executed by a processor, cause the processor to perform operations comprising:

registering a first device for a flexible download destination service that allows transfer of content to multiple devices, wherein registering the first device comprises associating the first device with a user associated with the first device and obtaining a media access control address associated with the first device;

detecting a download request for the content, wherein the download request is transmitted from the first device to a content server that stores the content, and wherein the first device executes an access module;

in response to detecting the download request, determining, based upon the media access control address, whether the user associated with the first device has subscribed to the flexible download destination service;

upon determining that the user associated with the first device has subscribed to the flexible download destination service by determining that account information associated with the user comprises the media access control address and a device identifier that corresponds to a second device, directing the access module executed by the first device to access and present a proxy interface that includes a list containing alternate download destinations, wherein the list includes the first device and the second device;

receiving, from the first device, a selection of the second device, wherein the selection is made via the proxy interface; and instructing the content server to transfer the content to the second device.

15. The non-transitory computer storage medium of claim 14, wherein instructing the content server to transfer the content to the second device comprises instructing the content server to transfer the content to the first device and the second device.

16. The non-transitory computer storage medium of claim 14, wherein instructing the content server to transfer the content to the second device comprises:

requesting the content from the content server;

upon requesting the content from the content server, receiving the content from the content server; and transferring the content to the second device.

17. The non-transitory computer storage medium of claim 14, wherein instructing the content server to transfer the content to the second device comprises:

determining whether the second device is available to transfer the content;

in response to determining that the second device is available to transfer the content, instructing the content server to transfer the content to the second device; and in response to determining that the second device is not available to transfer the content, storing an indication to retry a download in a download queue, and instructing the content server to transfer the content to the second device at a later time in accordance with the indication.

18. The non-transitory computer storage medium of claim 14, wherein receiving the selection of the second device comprises receiving a selection of the second device and a third device; and wherein instructing the content server to transfer the content to the second device comprises instructing the content server to transfer the content to the first device, the second device, and the third device.

19. The non-transitory computer storage medium of claim 14, wherein the device identifier comprises another media access control address.

* * * * *